Sept. 15, 1953 J. J. J. KERNAHAN 2,651,833

METHOD OF MOUNTING APPARATUS

Filed April 28, 1950 2 Sheets-Sheet 1

INVENTOR
J. J. J. KERNAHAN
BY
[signature]
ATTORNEY

Sept. 15, 1953 J. J. J. KERNAHAN 2,651,833

METHOD OF MOUNTING APPARATUS

Filed April 28, 1950 2 Sheets-Sheet 2

INVENTOR
J. J. J. KERNAHAN

BY [signature]

ATTORNEY

Patented Sept. 15, 1953 2,651,833

UNITED STATES PATENT OFFICE 2,651,833

METHOD OF MOUNTING APPARATUS

John J. J. Kernahan, Whippany, N. J., assignor to Bell Telephone Laboratories, Incorporated, New York, N. Y., a corporation of New York Application April 28, 1950, Serial No. 158,862

3 Claims. (Cl. 29—155.5)

This invention relates to a method for mounting electrical apparatus, and particularly to a method for securing a variety of circuit components in place on a panel or the like.

In the manufacture of radio sets and other electronic apparatus, it has been customary to manufacture each component, such as a socket, rheostat, or the like, as an individual unit. The individual units are mounted on a panel, subpanel, or chassis, after which they are connected together by individual wires, which have to be cut separately to size, shaped, and soldered to complete the circuit. With technical advances in the art, the number of components used has increased, but the size of the units has decreased. The crowding together of these components has made assembly and connection progressively more difficult, until as much as 50 per cent of the entire production cost of conventional sets has been attributable to wiring and soldering.

The printed circuit technique was developed as an aid to simplification of assembly and wiring problems. It introduced economy in manufacture by reducing the great number of separate wires, and eliminating many of the individual cutting and soldering operations in connecting the component pieces of apparatus. Additional steps in the direction of simplification have been made by forming certain of the components, such as resistors or capacitors, directly in the mounting panel. This likewise reduces manufacturing costs by doing away with many steps in the production and handling of units separately before assembly onto the panel. Connections are then made by any of the conventional printed circuit techniques, for example by applying silver or other conducting metal between the proper terminals by evaporation or by spraying through a stencil or screen.

One object of the invention is to provide a simplified technique for assembling circuit components in an economical and more rapid manner.

A further object of the invention is to provide means which do not require the use of elaborate mounting hardware in manufacturing and assembling circuit components.

Another object of the invention is to simplify the mounting and connecting of apparatus of such very small dimensions that it is difficult to utilize ordinary wire connections.

A still further object of the invention is to provide a simplified mounting means for a variety of circuit components which is suitable for use with printed circuit techniques.

The present invention provides an improvement in the method of assembling components and connecting members on a panel. The improved method is particularly well adapted to the completion of the remaining circuit connections by the printed circuit technique, although by no means limited thereto.

In accordance with a feature of this invention, connectors and components are affixed in position on the panel as on a mass production basis without requiring any securing means, such as screws and the like, and without being limited by close tolerances in the sizes of mounting holes. These desiderata are accomplished by making use of the "memory" characteristics of certain insulating thermoplastic compositions such as those known commercially by the trade names Plexiglas or Lucite, Polystyrene, and Tenite 2, which are respectively polymethyl methacrylate, polystyrene, and cellulose acetate butyrate compounds.

The "memory" characteristic referred to is the tendency of the plastic material, when heated to a certain temperature, deformed and cooled, to reassume its original shape upon reheating to the proper temperature range. The internal stresses produced by the deformation are effective, when the plastic is subsequently softened by reheating to a temperature at which the material is quasi-elastic, to cause a physical movement restoring the material as nearly as possible to its original shape. Thus, if a hole is punched in the heated plastic, stresses are set up in the material surrounding the hole. On reheating, these stresses will tend to cause a flow of the material back into the space from which the hole was punched: if a wire or other object has been inserted in the hole, it will be fixed in place by the material flowing back around it.

In one method illustrative of this invention, the punching of the panel is carried on with the aid of a recessed perforated metal backing plate. The perforations are made in the same pattern as that to be punched from the panel, and with substantially the same sizes of holes so that there will be no tearing out of material from the back of the panel, and some of the material will be caused to flow outwardly into the panel portion surrounding the punch. The backing plate normally rests on the stand or anvil of a conventional press, and is hollowed out underneath the holes to provide space for the discharge of the slight amount of material punched out. Holes are also provided for alignment pins, which insure proper registry of punch, stripper plate, and backing plates.

The panel and backing plate are clamped together and heated uniformly to a temperature at which the thermoplastic material becomes quasi-elastic. This may be conveniently done by electrical heating coils. In this condition, the panel retains its normal shape but it is less rigid than at normal temperatures. With Plexiglas, for example, the softening may begin as low as 175° F., and the best temperature for punching in connection with this process was found to be about 200° F. For equipment to be operated at a higher temperature range, a plastic such as Tenite 2 may be used, which begins softening at about 225° F., with the optimum punching temperature substantially above that point.

The punch is then applied to the heated panel through a stripper plate. The punch includes a retaining plate, a holder plate, and a plurality of aligning pins. The punching pins, of hardened material such as tool steel and of proper diameters, are mounted in the desired pattern in a holder plate, which may be formed of readily machined material such as brass. The holder plate also carries substantial alignment pins, which are of greater length than the punch pins. The alignment pins engage alignment bores formed in the backing plate and in the panel, to insure the proper registry of the apertured backing plate, the panel, and the punch, prior to the engagement of the punch pins with the panel.

The retaining plate is formed of relatively hard material, such as steel, and is secured firmly to the back of the holder plate by any convenient means, such as, for example, threaded extensions of the aligning pins. This plate serves to retain the punch pins in position in the holder plate during punching by providing a hard reinforcing backing to resist the forces being exerted. It also extends beyond, or overhangs, the ends of the holder plate, providing a supporting portion for the punch during the stripping operation described hereafter. Suitably placed bores are provided to aid in this operation.

The stripper plate is apertured in a pattern suitable to receive the punch and alignment pins. It is constructed of material such as brass of sufficient thickness and rigidity so that it will be effective in removing the punched panel from the punch and alignment pins without damage to the panel. The stripper plate is emplaced over the punch and alignment pins prior to the engagement of these elements with the panel. It remains between the holder plate and the panel during the punching operation.

Punching is accomplished by placing the punch, stripper plate, panel, and backing plate, in substantial alignment, on the anvil or press table of any suitable punch press, and applying pressure from the punch press to the retaining plate. The pressure should be applied centrally of the plate, or in some other manner which will assure a symmetrical distribution of pressure on the various punch pins. Perfect alignment is secured by the engagement of the alignment pins with the corresponding bores in the backing plate. The punched-out material, which is substantially less in amount than the volume of the bores produced, is discharged through the perforated backing plate. The punch, stripper, panel and backing plate are then allowed to cool to room temperature.

After punching and cooling have been completed, the punch, stripper plate, panel and backing plate are placed in a removal stand, where they are supported by the overhanging portions of the retaining plate while the panel is being stripped from the punch.

Drift pins, or the equivalent, are inserted through the bores provided in the retaining and holding plates of the punch until they engage the stripper plate, and pressure is applied to force the plastic panel off the punching and alignment pins. The pressure is distributed uniformly over the panel by the stripper plate, in order to prevent damage to the panel during the stripping. Any comparable method may, of course, be used to separate the panel from the punch.

The next stage in production is that of preparation for the insertion of the components to be mounted on the panel. The panel is placed on a jig recessed to limit the position of the inserted elements. The connecting wires and other circuit elements to be mounted are then inserted in the panel and properly aligned. The jig will permit penetration of each of these elements exactly the proper distance into the panel, and is secured to the panel to maintain these relationships while the bonds between the panel and the elements are formed.

The jig and panel are then heated to the proper temperature, which is the same as that at which the panel was punched, or about 200° F. for all of the listed materials except Tenite 2. The latter requires a temperature of above 225° F. to convert it from a state in which its properties are truly elastic to one in which it is only quasi-elastic, the condition in which these materials are able to flow to relieve previously induced internal stresses. After being held at the elevated temperature for a period of time sufficient for the requisite flow to occur, the jig and panel are allowed to cool to room temperature, and the jig is then removed.

As a result of the aforedescribed method the various elements are securely fixed to the panel, and the assembly is ready for further steps in the production process, such as adding other connections by one of the printed circuit techniques, for example. It is not necessary that the sizes of the punched holes be related to the size of the wire or component to be secured therein with extreme exactness. The flow is sufficient to accommodate a wide range of sizes and yet produce a firm bond. For example, lead wires and other elements ranging from .015 inch to 0.45 inch in diameter have been successfully mounted in one uniform size of punched holes. A temperature as high as 275° F. has been utilized with Plexiglas to induce a proper flow in a relatively short time, thus improving the speed of production. It is thus possible to introduce a new technique in mass production of equipment, using only a few standard sizes of punched holes to accommodate a wide variety of sizes of parts to be mounted. Lead wires at least .094 diameter may be accommodated, and panel thickness from $\frac{1}{32}$ inch to at least ¼ inch thick have been found suitable.

The invention and the features thereof will be understood more fully from the following detailed description with reference to the accompanying drawings, in which.

It is to be understood that the embodiments here shown are illustrative only, that the principles of the invention may be incorporated in other forms, and that all equivalent structures, materials, and methods are intended to be included within the scope of the present invention.

Figures 1, 2, 3, 4:
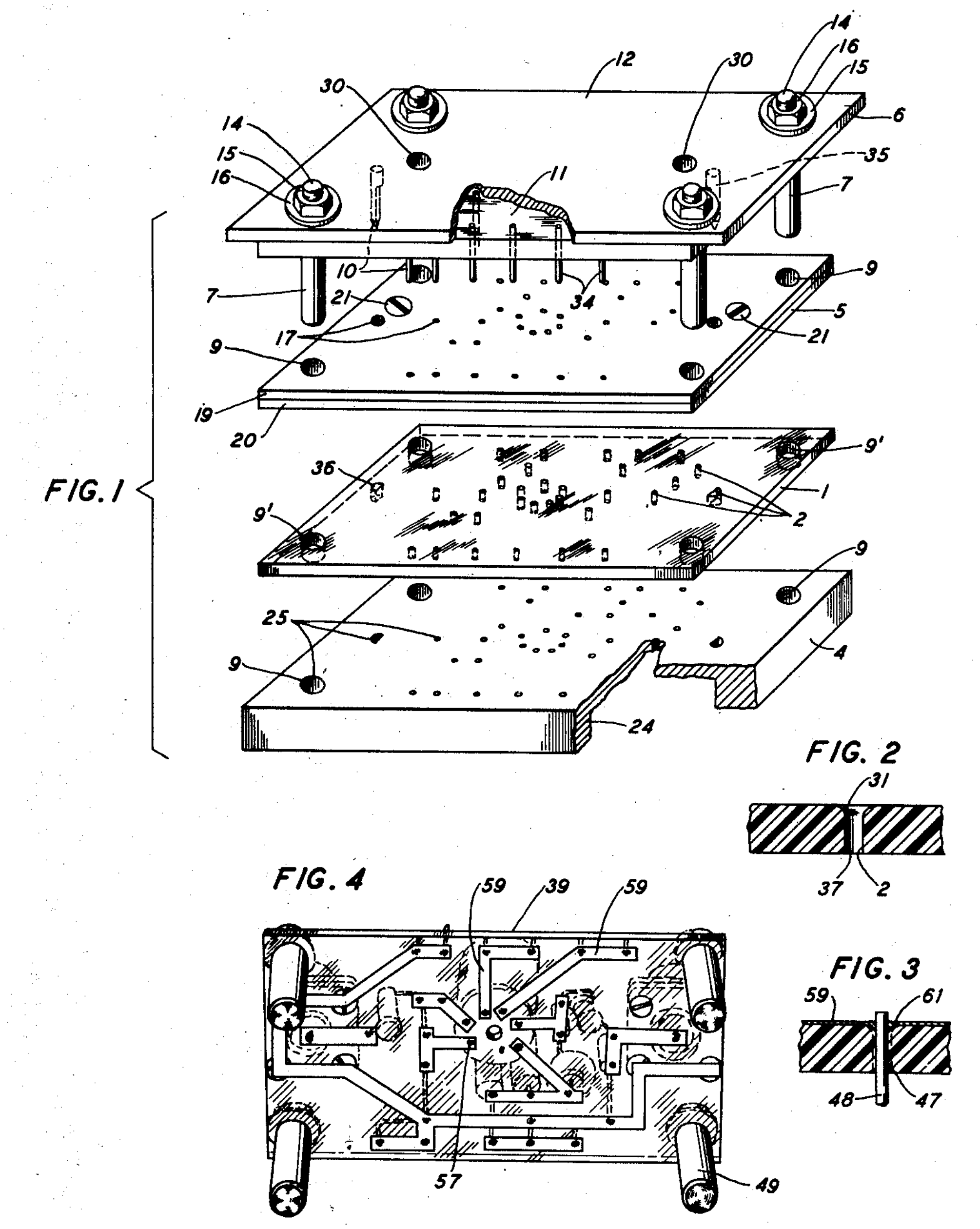
Fig. 1 is a perspective view of a punch, a stripper plate, a punched panel, and a backing plate, exploded to show clearly the relation and alignment of the implements for practicing the process.
Fig. 2 is a sectional view of a part of a panel after it has been prepared by punching to receive a connecting wire or circuit component.
Fig. 3 is a sectional view of a portion of a panel in which a connecting wire or circuit component has been secured.
Fig. 4 is a view, taken from the underside, of an amplifier the components of which have been mounted by the method of this invention and in which certain connections have been made by the printed circuit technique.

Referring now to the drawings, there is shown in Fig. 1 an exploded view of some of the equipment for practicing the invention. There is shown a panel 1, in which a plurality of holes 2 of different sizes and shapes have been punched; a backing plate 4, which supports the panel 1 during the punching; a stripper plate 5, which is used to remove the panel 1 after the punching operation; and the punch 6.

Punch 6 has an aligning pin 7 mounted at each corner. Pins 7 pass through alignment bores 9 in the stripper plate 5, then through corresponding alignment bores 9′ previously drilled through panel 1, and continue on into similarly disposed alignment bores 9 in the backing plate 4. Alignment pins 7 are of substantial construction and insure proper registry of punch, stripper plate, panel and backing plate during the punching operation. The alignment bores 9′ are used for proper alignment during the process and for subsequent mounting.

The punch 6 is conveniently made by embedding the punch pins, generally indicated as 10, in a holder plate 11, which may be brass or similar material which can be readily and accurately machined. A hardened retaining plate 12 of greater lateral extent than holder plate 11 is secured thereto to prevent axial displacement of the punching pins 10. Pins 7 may be extended through the retaining plate, threaded on their upper ends 14, and washers 15 and nuts 16 employed therewith to secure the retaining plate 12 tightly against the holder plate 11.

Stripper plate 5 is formed with a plurality of apertures 17 corresponding in size, shape, and location to the punch pins 10, and arranged to make a sliding fit therewith. Plate 5 is conveniently formed with an upper layer 19 and a lower layer 20 fixed removably together by means such as screws 21. One of the layers 19 or 20 may be used alone, or both together, for the better accommodation of different thicknesses of panel 1.

Backing plate 4 is shown as being hollowed out at 24 to permit free discharge of the slight amount of material punched from panel holes 2 through the backing plate apertures, generally indicated as 25, while the backing plate 4 is in place in the press, not shown. The punching pins will normally enter the backing plate apertures during this process, as seen in section in Fig. 9. During punching, the stripper plate is forced against the underside of holder plate 11, where it remains during cooling. After the pieces shown in Fig. 1 have cooled, they are placed in a removal stand 26, such as the U-shaped member shown in partial section in Fig. 9, with the edges of retaining plate 12 resting on the upright portions 28 of the stand.

Figure 9:
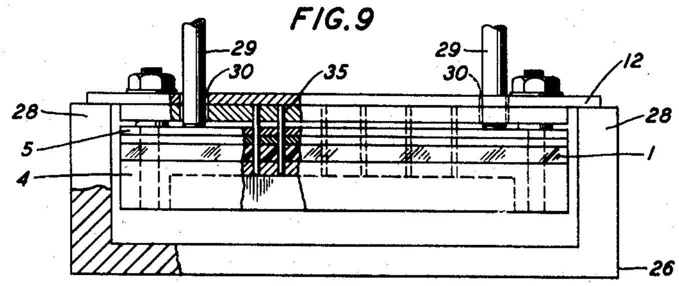
Fig. 9 is a side elevation, partially in section, illustrating a preferred arrangement for stripping the punch from a panel.

Drift pins 29, shown in Fig. 9, are then inserted through drift pin bores 30 formed in holder plates 11 and 12 of punch 6, and pressed against stripper plate 5 with even pressure to force panel 1 and backing plate 4 off the punching and aligning pins 10 and 7.

Figure 7:
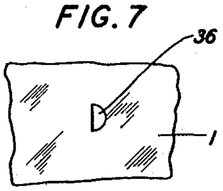
Fig. 7 shows a fragmentary portion of a panel, having therein an aperture for a special purpose mounting.

Panel 1 now has a number of bores, as indicated generally at 2 in Fig. 1. Each of the bores 2 will be dimpled on the side first engaged by the punch pins, as shown at 31 in Fig. 2. Such deformation or flow occurs for both types of punching pins illustrated at 10 in Fig. 1; producing bores as illustrated in Figs. 2 and 7. This dimpling is due to the pressure of the pointed end of the punching pin and flow of the plastic thereaway from. It occurs whether the point is rounded as shown at 34 in Fig. 1, or sharply pointed or odd-shaped, such as the semicircular pointed punch 34 which produces the semicircular aperture 36 shown in enlarged detail in Fig. 7 for the reception of a coaxial jack terminal. The bore end 37 which was adjacent the backing plate 4 during punching will, however, be squared off, and no burr or irregularity will appear at that point. This manner of pointing the punch and using a rather closely fitting corresponding bore in the backing plate 4 insures that a minimum of material will be removed from the plate in punching. This assures a bulid up of internal stresses due to material displacement. The panel is now ready for the reception of equipment to be mounted thereon.

Figure 5:
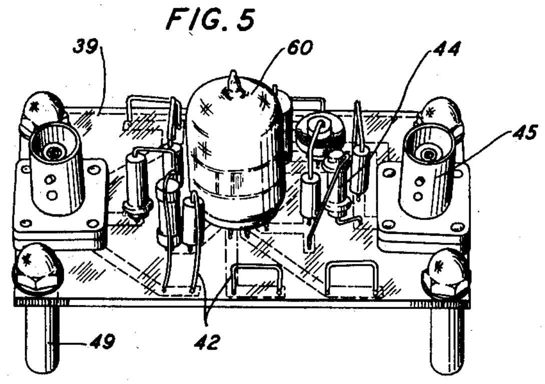
Fig. 5 is a view, taken from above, of the amplifier of Fig. 4.

An assembled amplifier 39 produced by this method is shown from the underside of Fig. 4, and from above in Fig. 5 by way of example; the hole pattern shown in Fig. 1 is that required for this exemplary assembly.

Figure 6:
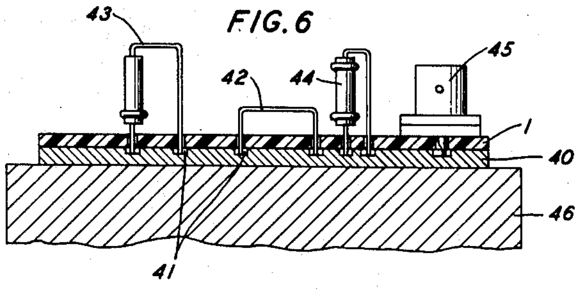
Fig. 6 is a sectional view showing a plurality of wires and circuit components inserted in a punched plastic panel and assembled with a mounting jig.

The next step toward the assembly shown in Figs. 4 and 5 is the setting up in position in the panel 1 on a jig, illustrated schematically at 40 in Fig. 6, which limits the extent of insertion, by means of recesses 41, of the leads and pieces of apparatus to be mounted, such as connecting wires 42, capacitor 43, resistor 44 and coaxial jack 45. The jig 40 and panel 1 are placed on a heating plate 46.

The panel and jig are then heated by the plate to the proper temperature range until adequate flow of the panel material has occurred, and then cooled again. It will be remarked that the portions of the inserts away from the panel are not necessarily heated. After removal of the jig, it will be found that the panel material has flowed back into the punched-out spaces, as shown at 47 in Fig. 3 for the bore 2 of Fig. 2, and firmly grasped the inserted apparatus, shown for example as a round lead 48. The panel may then be supported, for example, by inserting legs 49 in the aligning bores 9'.

Figure 8:
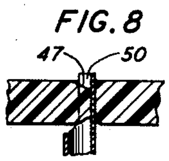
Fig. 8 is a sectional view showing the utilization of the apertured mounting element of Fig. 7.

The flow back action is also shown in Fig. 8 in connection with a coaxial jack terminal 50 which is inserted into the semicircular aperture 36 of Fig. 7. The flow back material 47 firmly envelops the semicylindrical terminal and locks it securely in place.

The flowing action permits utilizing relatively few sizes of holes in the punching, as it has been found that a given hole size will accommodate variations in the size of insert amounting to several diameters in the case of small leads, and still exert adequate holding force.

Figure 10:
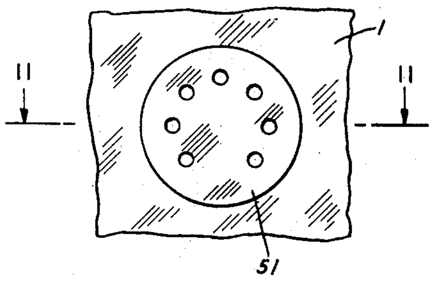
Fig. 10 is a top view of a preferred form of socket component adapted for panel mounting by the method of the invention.
Figure 11:
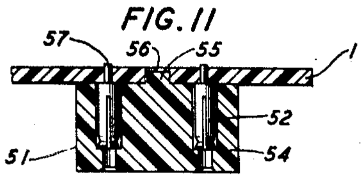
Fig. 11 is a sectional view, taken as indicated by line 11—11 of Fig. 10.

An illustration of the flexibility of this mounting method is seen in connection with Figs. 10 and 11, which show a preferred form of socket 51 mounted on the panel 1. Here the socket 51 comprises a plurality of tube contact pin-receiving resilient contact elements 52 fixed in panel 1, and a socket base 54 normally emplaced over the contact elements. Base 54 is removably fixed in panel 1 by a stud 55, which is force-fitted into a stud bore 56 in the panel. The terminal portions 57 of the contact elements 52 may then be connected in circuit with the other components by printed circuit connection elements 59, as seen in Fig. 4, applied in a conventional manner and provide connections for the tube 60 seen in Fig. 5. Completion of the circuit by such printed circuit connections 59 to all of the mounted apparatus is then a simple step.

The dimpling referred to above in the description of Fig. 2 which occurs around the point of entrance of punch pins 10 is of particular advantage in making such connections. The printed circuit-connecting element material applied as shown at 59 in Fig. 4 will flow into the dimple 61, seen in enlarged detail in Fig. 3, remaining after the reheating of the panel, and make a more secured connection with the lead 48. This is especially useful when the silk screen technique is chosen as the method for completing the circuit.

The dimpling is also advantageous in connection with the insertion of the parts into the proper positions in the panel, as shown in Fig. 6, since the depressed dimple acts as a guide to direct the fine leads into their respective mounting bores.

It will thus be seen that a method has been invented for the mounting of circuit components and connections which is adapted to the mass production of electronic equipment in a rapid, efficient, and economical manner.

What is claimed is:

1. The method of manufacturing electronic equipment which comprises forming to size a panel of a thermoplastic having the ability to reshape itself on heating to a temperature range in which the material is quasi-elastic, in accordance with stresses introduced thereinto during a prior heating to a quasi-elastic condition; heating said panel and a backing plate having a plurality of apertures precisely aligned with the bores to be punched, to a temperature at which said panel is quasi-elastic; applying a punch, having a plurality of punch pins extending therefrom and through an aperture stripper plate, to said heated panel and punching the panel; cooling said backing plate, panel, stripper plate, and punch, removing said stripper plate punch and punch pins from said panel, inserting connecting wires and components to be mounted on said panel in the bores left by said punch pins, maintaining said wires and components in position while reheating the panel to the quasi-elastic temperature range; and cooling said panel to room temperature.

2. The method of manufacturing electronic apparatus having a plurality of panel-mounted components and connections, which comprises providing a panel of a thermoplastic material having a memory characteristic; heating said panel and a backing plate, apertured in the pattern desired for the mounting of the components, to a temperature at which the panel becomes quasi-elastic; forcing through said panel, through a stripper plate, a plurality of punch pins fixed in the desired pattern; cooling the assembly, stripping said punch from said panel, securing the components and connections in position for insertion in the bores formed by said punch, inserting said components and connections in proper position in said bores in said panel; reheating said panel to the quasi-elastic temperature, and cooling said panel to room temperature while maintaining said components and connections in proper position.

3. A method of securing a plurality of objects of various sizes to a mounting means, which comprises utilizing a plastic having memory characteristics for said mounting means, heating said plastic to the region of quasi-elasticity, forcing through the plastic punching means having the requisite numbers and patterns of bores in transverse dimensions related only by their orders of magnitude to the transverse dimensions of the objects to be secured in said mounting means, retaining said punching means in position while said plastic cools, withdrawing said punching means, inserting said plurality of objects in the bores from which said punching means have been withdrawn, maintaining said objects in position while reheating said plastic to the region of quasi-elasticity, and cooling said plastic to room temperature.

JOHN J. J. KERNAHAN.

References Cited in the file of this patent

UNITED STATES PATENTS

| Number | Name | Date |
|---|---|---|
| 1,368,233 | Becker | Feb. 15, 1921 |
| 1,461,071 | Schumacher | July 10, 1923 |
| 1,721,170 | Wrighton | July 16, 1929 |
| 1,844,637 | Chubb | Feb. 9, 1932 |
| 1,862,633 | Ramsay | June 14, 1932 |
| 2,017,772 | Schildgen | Oct. 15, 1935 |
| 2,027,962 | Currie | Jan. 14, 1936 |
| 2,252,504 | Hahn | Aug. 12, 1941 |